United States Patent
Harris, Jr.

Patent Number: 5,392,203
Date of Patent: Feb. 21, 1995

[54] SIGNAL LIGHT ASSEMBLY AND METHOD OF MANUFACTURE

[75] Inventor: Theodore Harris, Jr., Raleigh, N.C.

[73] Assignee: American Airlines, Inc., Dallas/Fort Worth Airport, Tex.

[21] Appl. No.: 947,302

[22] Filed: Sep. 18, 1992

[51] Int. Cl.$^6$ .............................................. F21L 7/00
[52] U.S. Cl. .................... 362/186; 362/102; 362/158; 362/205
[58] Field of Search ............... 362/102, 171, 173, 178, 362/182, 186, 189, 202, 204, 205, 223, 356, 158, 222

[56] References Cited

U.S. PATENT DOCUMENTS

| | | | |
|---|---|---|---|
| 2,225,151 | 12/1940 | Borba | 362/102 |
| 2,245,349 | 6/1941 | Lombardi | 362/102 |
| 3,690,599 | 9/1972 | Hager | 244/114 R |
| 3,896,432 | 7/1975 | Young | 343/5 LS |
| 3,935,557 | 1/1976 | Nichols | 340/25 |
| 4,114,187 | 9/1978 | Uke | 362/158 |
| 4,208,701 | 6/1980 | Schock | 362/102 |
| 4,236,544 | 12/1980 | Osaka | 362/102 |
| 4,249,159 | 2/1981 | Stasko | 340/26 |
| 4,345,305 | 8/1982 | Kolm et al. | 362/202 |
| 4,890,203 | 12/1989 | Watson | 362/102 |
| 5,036,442 | 7/1991 | Brown | 362/102 |
| 5,050,053 | 9/1991 | McDermott | 362/204 |
| 5,271,640 | 12/1993 | Potochick et al. | 362/102 |

FOREIGN PATENT DOCUMENTS

| | | | |
|---|---|---|---|
| 0322091 | 7/1957 | Switzerland | 362/102 |
| 0244952 | 12/1925 | United Kingdom | 362/186 |

*Primary Examiner*—Stephen F. Husar
*Assistant Examiner*—Alan B. Cariaso
*Attorney, Agent, or Firm*—Johnson & Wortley

[57] ABSTRACT

A signal light comprising an elongate translucent tubular member formed of a light plastic material having a light source disposed therein for emitting illumination therefrom and providing guidance and orientation to aircraft and the like. A battery and a light bulb comprising a light source are housed entirely within the tubular member. A flush mounted switch is recessed entirely within a predetermined end of the tubular member to control an electrical connection between the battery and the light source. The signal light has a smooth continuous outer surface to provide structural rigidity and enable its use for visual signalling during both daytime and nighttime.

16 Claims, 1 Drawing Sheet

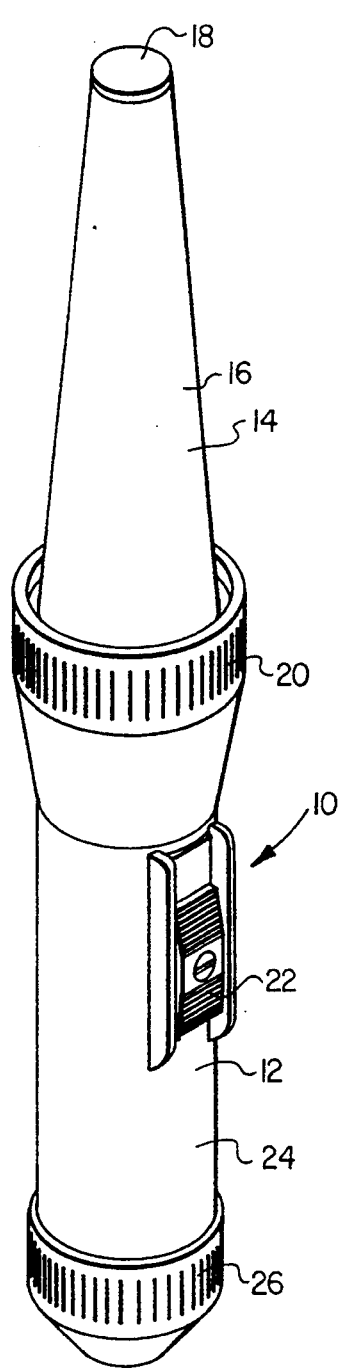
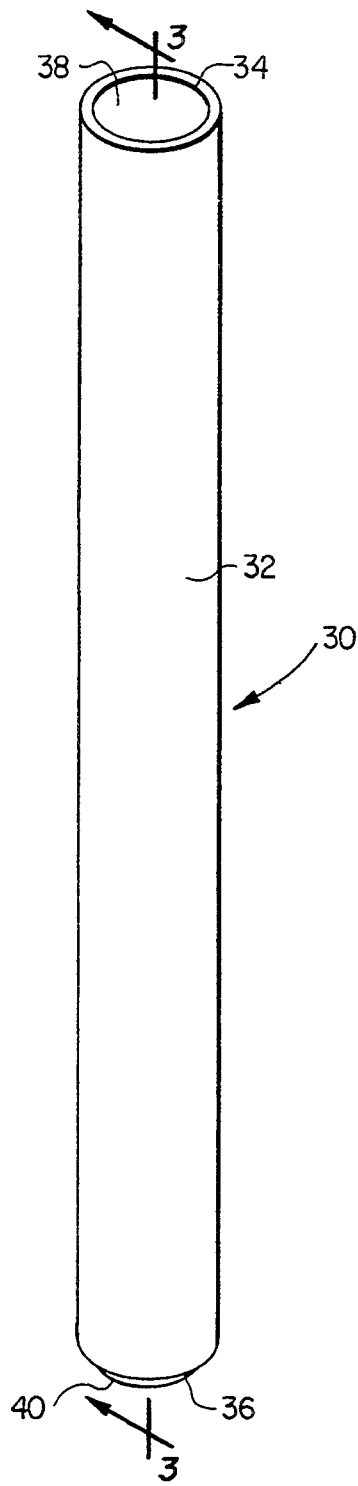
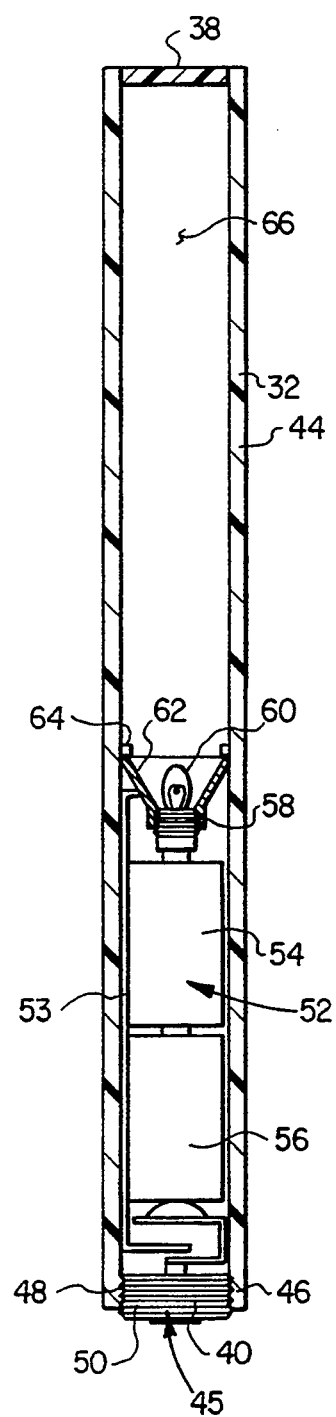
FIG. 1 (PRIOR ART)
FIG. 2
FIG. 3

SIGNAL LIGHT ASSEMBLY AND METHOD OF MANUFACTURE

BACKGROUND OF THE INVENTION

1. Field of the Invention

The present invention relates generally to illumination devices and, more particularly, to a signal light assembly for communicating position and orientation of an elongate illumination member and its method of manufacture. In one embodiment, the invention relates specifically to a signal light wand for airport ground personnel to use during all hours of the day or night when assisting in the docking of aircraft.

2. History of the Prior Art

The prior art is replete with light assemblies specifically designed for particular lighting needs and/or specialized applications. Such light assemblies are used for both aesthetic and utilitarian purposes, and include both fixed and portable lighting systems. It is well known to use flood lighting systems for broadly illuminating dark areas, and spot lighting systems for providing select illumination of persons, places, or things in regions that are not otherwise illuminated. A myriad of designs thus fill the prior art repertoire of specialized light assemblies.

Important areas for the application of enhanced lighting systems are found in the transportation industry. Within transportation industry applications, moreover, the single segment reflecting the greatest need for a diversity of specialized lighting systems is the airline industry. Since the use of aircraft is not limited to daylight hours and good weather, aircraft operators depend upon a variety of specialized lighting systems to make night and inclement weather operations possible, safe, and profitable. Such specialized lighting systems are used, for example, to delineate runway thresholds, centerlines, and edges, and to designate taxiways and unsafe areas such as areas under construction which are not otherwise visible under poor ambient light conditions. Additionally, specialized lighting systems illuminate docking terminals, maintenance and servicing areas, and the airplane itself. Specialized lighting assemblies are also used by ground crews to guide aircraft to the terminal and otherwise assist the pilot in maneuvering the aircraft on the ground. This function provides one application of the present invention.

Aircraft on the ground are safely guided about the terminal regions of airports through the use of predefined signals between ground crew personnel and the pilots of taxiing aircraft. Taxi lines and docking lines painted on the airport tarmac provide a general reference to the pilot as to where the plane should be turned, and such lines are visible to the pilot even at night when the pilot uses the aircraft's taxi light to illuminate the area in front of the aircraft. Often, however, in the darkness of night and/or bad weather and with the congestion which frequently occurs around the terminal area, only the ground crew personnel are clearly aware of obstacles and/or other parked aircraft which may make the taxi line or docking line an unsafe course for the pilot to follow.

When docking an aircraft, after turning from the taxi line, the pilot brings the nose wheel on to the lead-in, or docking line, and is guided by the ground crew to a specific stopping point on the docking line. From this point at which the aircraft turns from the taxi line onto the docking line and proceeds toward the docking terminal, the pilot relies more and more on the ground crew personnel to provide precise directional and speed guidance. Obstacles must be avoided, and the final position of the nose wheel of the aircraft must be precisely controlled in order to align the aircraft door with the terminal passenger ramp. The pilot generally extinguishes the taxi lights when the aircraft is moved onto the docking line in order to preclude destroying the night vision of the ground crew or the pilots of adjacent aircraft, and because the actual position of the aircraft nosewheel is out of the pilot's direct field of view anyway. During daytime operations, the ground crew directs the pilot in the docking operation by utilizing a pair of elongate signal members, which are generally of a bright color (such as dayglow orange). Similarly, lighted signal wands of various colors are used during nighttime operations. In this manner the pilot is directed to guide the aircraft along the docking line and stop it with the nose wheel positioned at the precise stopping point necessary for alignment of the aircraft doors with the passenger ramp.

As mentioned above, different signalling members are generally used by the ground crew during the daytime from those used during nighttime operations. Conventional nighttime light wands typically include a conventional flashlight unit having a semi-transparent light cone extending over the illumination end thereof for generating an elongate illumination area that is easily visible to the pilot who is taxiing the aircraft. The elongate configuration of the light cone allows select signals to be presented to the pilot based upon the angular orientation and/or movement of the unit by the ground personnel.

The presentation of guidance signals to aircraft by the ground crews is a well established art. Codes have been developed and visual signal sequences may be observed by even the passengers in commercial aircraft as the ground crew personnel move, wave, cross and turn lighted members in direct non-verbal communication with the pilot of an aircraft being taxied. A critical aspect of this illuminated signalling by the ground crew is, of course, the construction of the light surface from which the illumination emanates. The tubular members which are typically used in daylight hours are generally formed of plastic with a readily visible dayglow color. Such bright colors are provided in order to enhance the visibility of signalling to the pilot of the taxiing aircraft. Hollow tubular signalling wands are vibrantly bright, light weight, durable and generally inexpensive. Because of these features they have found widespread acceptance in the air transportation industry. It would be beneficial and cost effective to utilize the same tubular members at all times. However, during periods of darkness or inclement weather, the pilot's ability to see the hollow tubular wands is diminished and signalling by the ground crew must then be enhanced by the above-referenced specialized light assemblies. For this reason, flashlight based signalling units have become essential elements of the ground crew's equipment for use during such periods of darkness.

Conventional flashlights, however, are not as durable as the hollow, plastic daytime wands. One of several problems with such flashlight assemblies is the fragile nature of both the flashlight and the colored light cone. Conventional flashlights have switches, buttons, flanges and the like protruding from what is generally a contoured body. Accidental actuation of the flashlight is possible through inadvertent contact with the protruding switch. Such a switch is also susceptible to unintended actuation if the flashlight is dropped. Additionally, the light cone, which attaches to the lighted end of the flashlight, is typically of a thin-walled construction. Because of these protrusions and the thin-walled construction of the light cone, prior art signal light assemblies often break when they are dropped or subjected to other stresses which are common in the hectic pace of an airport terminal operation.

Enhancement of the reliability, effectiveness, and durability of a signal light assembly in the air transportation industry, and reduction in the number of different types of equipment required by a ground crew, would be greatly beneficial in terms of time and money saved and improved safety. The present invention provides such improvements by utilizing a rugged, translucent tubular member having a surface which is easily recognizable by pilots from a distance, during both daytime and nighttime use. The tubular member has all illumination and activation components disposed therein to comprise both a slightly visible signalling wand for daytime operation and an effective light wand for periods of darkness. No external elements protrude from the right-regular cylindrical body of the subject light assembly to weaken the structural integrity thereof. Its closed-end construction also adds greater strength and durability, and enables it to withstand the rugged treatment of the airport terminal environment. In addition, a recessed switch member provides for more reliable operation of the light wand since with the switch recessed, it is less likely to be accidentally actuated. Likewise the recessed switch does not provide a protuberance which weakens the overall structure. In the preferred embodiment, the construction of the recessed switch seals one end of the tubular housing to prevent moisture intrusion. A versatile and reliable signalling member is thus provided in an elongate construction which is easily recognizable in both daylight and darkness.

It should be noted that the light wand constructed in accordance with the present invention is not restricted to use in the airline industry. Its improvements and benefits are equally applicable to use by highway construction crews, police departments, and other organizations with the need for reliable and effective visual signalling devices.

SUMMARY OF THE INVENTION

The present invention relates to signalling devices and their method of manufacture. More particularly, one aspect of the present invention includes a lighted signal member comprising an elongate, translucent tubular member adapted for selectively providing self contained, illumination therefrom, for use in daylight or darkness. The tubular illumination member is of a generally elongate, cylindrical construction. One end is sealed against moisture intrusion, and the other end is formed with a recessed actuation switch. A light energy generation source comprising at least one battery and a light bulb is disposed within the tubular member in electrical communication with the switch device. The light assembly embodies a rugged, substantially uniform external configuration which improves the structural integrity thereof and provides a vibrant, highly visible glow therefrom for use in signalling at night.

In another aspect, the present invention comprises a light illumination assembly including an elongate, thick-walled, tubular member having one end sealed and with a switch recessed in the other end of the tubular member for controlling an electric circuit and sealing out moisture. At least one battery is disposed within the tubular member adjacent to the switch means. Also, at least one light element is secured within the tubular member in electrical communication with the switch and the battery for emitting light therefrom upon actuation of the switch to provide an elongate, translucent illumination wand for various signal applications.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a perspective view of a prior art signal light assembly of the type conventionally utilized in airports and the like;

FIG. 2 is a perspective view of one embodiment of a signal light constructed in accordance with the principles of the present invention; and FIG. 3 is a side elevational, cross-sectional view of the signal light of FIG. 2.

DETAILED DESCRIPTION

Referring first to FIG. 1 there is shown a signal light assembly 10 of a type well known within the prior art. The signal light assembly 10 comprises a flashlight 12 of conventional design with a translucent light cone 14 secured outwardly therefrom. As used herein, the term "translucent" means a material capable of transmitting and diffusing light to some degree. Light cone 14 includes a cone-shaped body portion 16 terminating in a substantially flat top region 18. Beneath the cone 14, a light bulb located within the flashlight 12 (not shown) emits light rays up into the inside walls of the translucent cone 14. The top of the flashlight 20 may be specially adapted for the securement of the cone 14 thereto. As shown, a switch 22 is provided for actuating an electric circuit including batteries and the light bulb (not shown) that are contained within the body 24 of the flashlight 12. An end cap 26 is shown secured to the bottom of the flashlight body 24 for purposes of providing access to the batteries contained within the flashlight. Such signal light assemblies 10 are currently used by ground crews at commercial airports for directing and signalling aircraft during taxiing operations.

Referring now to FIG. 2 there is shown a light wand 30 constructed in accordance with the principles of the present invention. Light wand 30 includes an elongate tubular member or housing 32 formed of translucent material having a top end 34 and a bottom end 36. The housing 32 is formed in the configuration of a hollow, right-regular cylinder having a wall thickness on the order of 10% of the outside diameter (O.D.). For example, the housing 32 may have a wall thickness on the order of ⅛th inch and an outside diameter on the order of 1¼ inch. The housing 32 is preferably constructed of a thick-wall polyethylene plastic tube, and provided in a vibrantly bright color such as a dayglow orange or dayglow pink to facilitate the visibility thereof. Top end 34 of the preferred embodiment is sealed with a circular plug member 38 to prevent moisture infiltration and provide enhanced structural integrity. It should be noted that the plug 38 may be either clear (for allowing a conventional flashlight function from the end of the housing) or a similar light translucent color as the housing 32 and should be firmly secured (either permanently or removably) within the region of the open upper end of the housing 32. Bottom end 36 is constructed with a flush mounted switch member 40, the body of which is recessed within housing 32. The switch 40 allows selective actuation of an electrical lighting assembly (shown in FIG. 3) contained within the housing 32. The elongate body portion 32 may be of the type as the tubular wand discussed above and conventionally utilized as a hollow daytime signal wand for daytime signalling of aircraft by ground crew personnel. One embodiment of the present invention utilizes the existing body 32 of such a hollow daytime signal wand by providing an improvement thereto permitting its use during both daylight and darkness.

Referring now to FIG. 3, there is shown a side elevational, cross-sectional view of the light wand 30 of FIG. 2, taken along lines 3—3 thereof. The wand assembly 30 is constructed with thick cylindrical walls 44, generally made of translucent plastic or the like, and lightly colored to enhance visibility during both daylight and in darkness. The walls 44 are of a substantially uniform cylindrical shape with a smooth continuous center surface and no protrusions extending outwardly therefrom. The uniform, cylindrical outer surface maximizes the stress distribution along walls 44 from external forces or loads applied thereto. Such loads may occur when, for example, baggage is inadvertently laid upon the wand 30 or when it is accidently stepped on or dropped. The smooth configuration of the walls 44 prevents any single area from serving as a stress-strain focal point for weakening the structure. In this manner, the light wand 30 may be dropped, shaken, stepped on, and generally abused without being severely damaged, as is not the case with the prior art flashlight assembly 10 of FIG. 1.

Still referring to FIG. 3, the switch 40 is externally threaded and, in the preferred embodiment, threadably received into threads formed along the inner wall of lower region 46 of the wand 30. Externally threaded section 48 formed upon the switch member 40 receives internal threads 50 within the tube 32. The threaded engagement further facilitates sealing of the lower end 46 of the light wand 30 and permits the switch 40 to be fully recessed within the walls 44 of the wand 30 so that little or no portion thereof protrudes from the lower end of the cylindrical tube 32. Switch 40 provides a means for controlling electrical contact within the lighting assembly 52 mounted in the tubular housing 32 through electrical connector bracket 53.

Referring still to FIG. 3, the lighting assembly 52 comprises first and second batteries 54 and 56, however, it should be noted that any number of batteries, including rechargeable batteries, could be provided in accordance with the principles of the present invention. The batteries 54 and 56 are disposed adjacent to connector bracket 53 and switch 40, although other positions, including those disposed away from the switch 40, could be used in accordance with the principles of the present invention. A different connector bracket 53 would, of course, be needed. Likewise a light illumination source 58 of conventional design is shown disposed contiguous to the top battery 54. The light illumination source 58 includes, in this embodiment, a light bulb 60 and a reflective cone 62, as is conventional with flashlight assemblies. The light illumination source 58 is secured within the tubular member 32 in this particular embodiment by a ring-shaped member 64 mounted on the inside surface of the walls 44. Any conventional securement technique could also be utilized. In a preferred embodiment, the light assembly 52 is installed within the wand 30 contiguous to the walls 44 to allow only digital access to the switch 40. The region 66 disposed upwardly from the light illumination source 58 is, in the present embodiment, hollow, which facilitates light dispersion therein and the passage of the light through the translucent walls 44 of the cylindrical housing 32. It should be noted that a clear fluid or other clear material could likewise be disposed within the hollow region of 66 in accordance with the principles of the present invention so long as sufficient light is disbursed through the walls of the tubular housing 32, to serve the purpose intended. Similarly, the plug 38 could be secured at a point disposed inwardly from the end 34, leaving the region thereabove open.

In operation, the light wand 30 of the present invention provides a durable signal light assembly that is capable of reliable operation in a demanding and potentially hostile environment. As discussed above, the airport terminal region is an area characterized by high-tempo operations utilizing heavy equipment and sustaining a high level of activity. Vehicles are continually moving back and forth and ground personnel are walking quickly between different areas. The light wand of the present invention provides a rugged, durable signalling assembly that is well suited to this environment. The construction of the assembly of the present invention, with both the light illumination source 58 and the light switch 40 recessed within the right regular-cylinder configuration described above, provides a smooth outer configuration absence of protuberances which would otherwise create stress risers or areas that could amplify stress during handling of the light wand. The light wand of the present invention will, therefore, provide more durable service through both routine handling and occasional accidents where individuals may drop or step on the light wand, or where vehicles or heavy luggage may be placed upon it. The light wand is very similar in external appearance to existing daylight signal wands and may indeed utilize the same or similar tubular signal wand housings. The same assembly is, thus, usable in both daylight or darkness, reducing the amount of equipment needed by ground crews. In addition, the recessed switch member 40 facilitates use of the light wand in a more reliable fashion. With the switch 40 recessed, it is less likely to be accidentally actuated, and likewise, does not provide a protuberance on the outer surface of the wand that can weaken the overall structure. In the present embodiment, the construction of the switch 40 also seals the tubular housing 32 to prevent moisture intrusion, and dropping the light wand 30 should not accidentally actuate it. Thus, the present invention includes numerous advantages over prior art embodiments.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:
1. A light signalling assembly comprising:
   an elongate cylindrical hollow tubular member formed of translucent material for providing illumi- nation therefrom and having a first illumination end and a second oppositely disposed actuation end, said member exhibiting a smooth, continuous outer surface for providing structural integrity and an elongate axis for determining the angular orientation of said member;

a light source disposed entirely within said hollow tubular member and including a lamp and a power source; and a flush mounted control switch recessed entirely within the actuation end of said tubular member for selectively controlling the electrical connection between said lamp and said power source, said flush mounted control switch includes a generally cylindrical body portion having an elastomeric end responsive to pressure thereupon along said elongate axis for actuation of said flush mounted control switch.

2. The assembly as set forth in claim 1 wherein said illumination end further includes a generally cylindrical plug secured within the region of the open end of said tubular member for precluding moisture infiltration into said assembly.

3. The assembly as set forth in claim 1 wherein said power source includes at least two batteries disposed within said tubular member positioned adjacent to and electrically connected with said flush mounted control switch and said lamp.

4. The assembly as set forth in claim 1 wherein said tubular member comprises a right-regular cylindrical structure.

5. The assembly as set forth in claim 4 wherein said right-regular cylindrical structure is formed of translucent plastic having a dayglow color.

6. The assembly as set forth in claim 4 wherein said right-regular cylindrical structure is constructed with a wall thickness on the order of 10% of the outside diameter of said cylindrical structure.

7. The assembly as set forth in claim 1 wherein said light source and said flush mounted control switch are disposed in a lower region of said tubular member with said upper region thereof being hollow to facilitate the dispersion of light therein and the transmission of light through the side walls thereof.

8. The assembly as set forth in claim 7 and further including a generally cylindrical plug secured within said upper portion of said tubular member in sealed engagement therewith.

9. An illumination assembly comprising:

an elongate tubular member having an elongate axis, translucent side walls and first and second ends thereof;

a flush mounted switch disposed entirely within said second end of said tubular member, said flush mounted switch includes a generally cylindrical body portion having an elastomeric end responsive to pressure thereupon along said elongate axis for actuation of said flush mounted switch;

at least one battery disposed within said tubular member;

a light emission element secured within said tubular member in electrical communication with said flush mounted switch and said at least one battery for producing light therefrom upon actuation of said flush mounted switch; and means securing said light emission element and said at least one battery within the region of said second end of said tubular member for emitting light against the translucent side walls of said tubular member in the region of said first end and creating an elongate illuminated region for visual signalling.

10. A method of manufacturing an illuminated signalling wand from a conventional nonilluminated signalling wand of the type comprising of an entire length of translucent tubing having a bright color and an elongate axis, said method comprising the steps of:

providing a light assembly including a lamp, at least one battery, and a digitally actuated switch responsive to pressure thereupon along said elongate axis for actuation thereof, said switch having a generally cylindrical housing;

preparing the interior surface of one end of said wand for receipt and securement of said switch housing therein;

installing said light assembly within said wand contiguous said prepared interior surface thereof to position said switch in a recessed position in the one end of said wand, and to only allow digital access to said switch; and sealing the opposite end of said wand against the intrusion of moisture whereby actuation of said switch energizes said lamp to illuminate the translucent walls of said tubing and enable nocturnal use of said signalling wand.

11. The method as set forth in claim 10 wherein said switch housing is formed with exterior threads and said step of preparing said interior surface of said wand includes the step of forming threads along said interior surface.

12. The method as set forth in claim 11 wherein said step of installing said light assembly within said wand includes the step of screwing said switch housing into said threaded interior surface of said wand.

13. The method as set forth in claim 10 wherein said step of installing said light assembly within said wand includes the step of securing said lamp at an intermediate position within said wand.

14. The method as set forth in claim 13 and further including the step of inserting at least one battery into said wand to a position contiguous with said lamp.

15. The method as set forth in claim 14 and further including the step of connecting said switch to said at least one battery and to said lamp to enable the flow of current therebelow when said switch is actuated.

16. The method as set forth in claim 10 wherein said step of sealing the opposite end of said wand includes the steps of inserting a generally cylindrical plug into the open end thereof and securing said plug within said open end of said wand.

* * * * *